(12) United States Patent
Nelson

(10) Patent No.: US 6,232,603 B1
(45) Date of Patent: May 15, 2001

(54) RAIN SENSOR OPERATION ON SOLAR REFLECTIVE GLASS

(75) Inventor: Robert J. Nelson, Winona, MN (US)

(73) Assignee: Kelsey-Hayes Co., Livonia, MI (US)

( * ) Notice: Subject to any disclaimer, the term of this patent is extended or adjusted under 35 U.S.C. 154(b) by 0 days.

(21) Appl. No.: 09/182,554

(22) Filed: Oct. 29, 1998

(51) Int. Cl.[7] .................................................. G01N 15/06
(52) U.S. Cl. .............................. 250/339.11; 250/227.25; 250/341.8
(58) Field of Search .......................... 250/227.25, 341.8, 250/339.11

(56) References Cited

U.S. PATENT DOCUMENTS

| | | |
|---|---|---|
| 4,620,141 | 10/1986 | McCumber et al. . |
| 4,701,613 | 10/1987 | Watanabe et al. . |
| 4,798,956 | 1/1989 | Hochstein . |
| 4,859,867 | 8/1989 | Larson et al. . |
| 4,867,561 | 9/1989 | Fujii et al. . |
| 4,871,917 | 10/1989 | O'Farrell et al. . |
| 4,960,996 | 10/1990 | Hochstein . |
| 4,973,844 | 11/1990 | O'Farrell et al. . |
| 5,059,877 | 10/1991 | Teder . |
| 5,239,244 | 8/1993 | Teder . |
| 5,255,442 | 10/1993 | Schierbeek et al. . |
| 5,262,640 | 11/1993 | Purvis et al. . |
| 5,386,111 | 1/1995 | Zimmerman . |
| 5,391,891 * | 2/1995 | Wiegleb et al. ................ 250/227.25 |
| 5,412,296 | 5/1995 | Chien et al. . |
| 5,428,277 | 6/1995 | Stanton . |
| 5,432,415 | 7/1995 | Ittah et al. . |
| 5,436,541 | 7/1995 | Mangler et al. . |
| 5,453,670 | 9/1995 | Schaefer . |
| 5,453,676 | 9/1995 | Agrotis et al. . |
| 5,459,380 | 10/1995 | Augustinowicz . |
| 5,493,190 | 2/1996 | Mueller . |
| 5,498,866 * | 3/1996 | Bendlicks et al. ............... 250/227.25 |
| 5,506,483 | 4/1996 | McCann et al. . |
| 5,506,595 | 4/1996 | Fukano et al. . |
| 5,508,595 | 4/1996 | Schaefer . |
| 5,556,493 | 9/1996 | Teder et al. . |
| 5,560,245 | 10/1996 | Zettler et al. . |
| 5,661,303 * | 8/1997 | Teder ................................. 250/341.8 |

* cited by examiner

Primary Examiner—Constantine Hannaher
Assistant Examiner—Otilia Gabor
(74) Attorney, Agent, or Firm—Harness, Dickey & Pierce, P.L.C.

(57) ABSTRACT

A device for detecting the presence of moisture on an outside surface of a windshield is disclosed. The device includes am emitter for transmitting energy, a sensor for receiving energy, an energy absorbing member and a controller for monitoring energy.

14 Claims, 4 Drawing Sheets

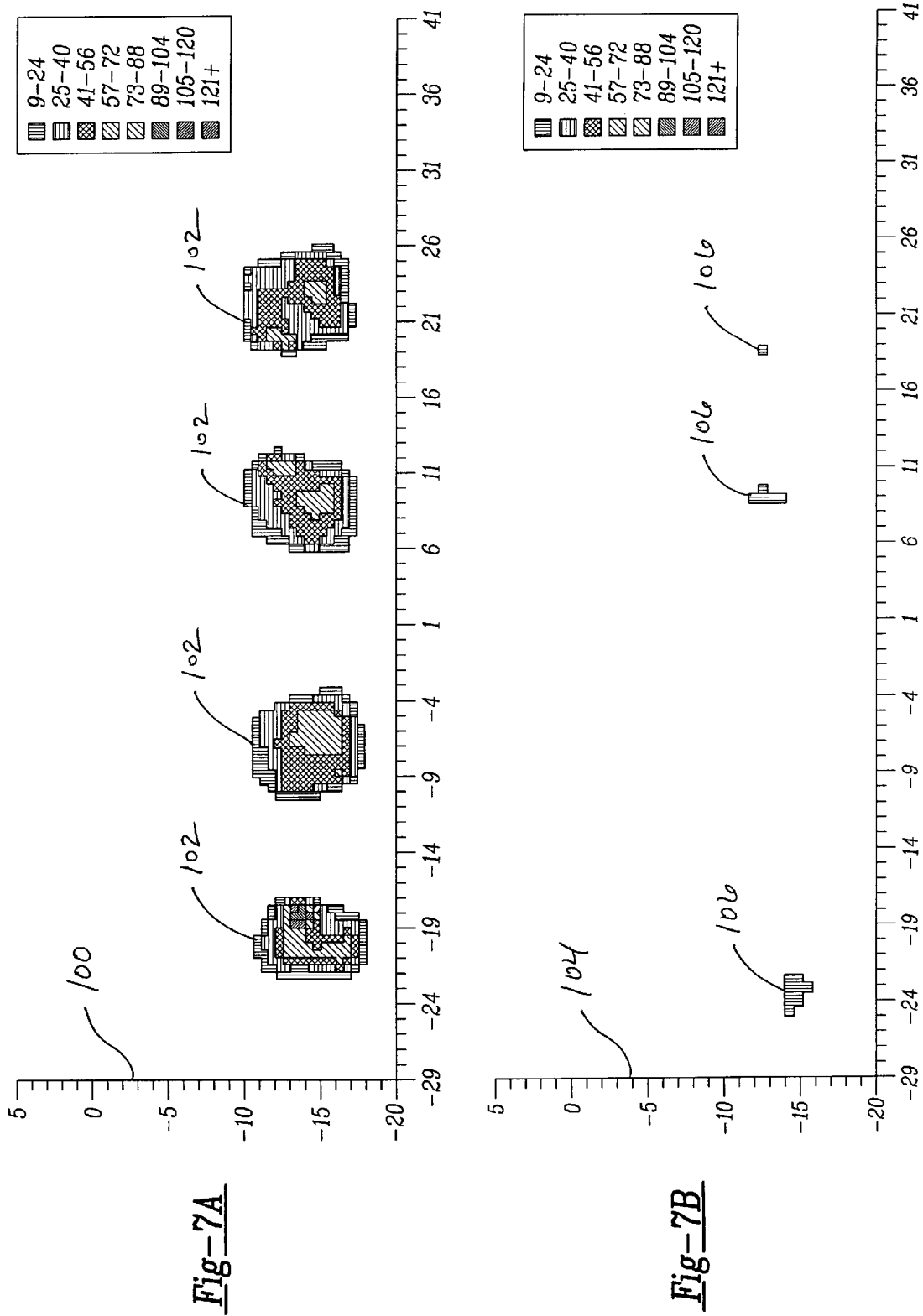

RAIN SENSOR OPERATION ON SOLAR REFLECTIVE GLASS

BACKGROUND OF THE INVENTION

1. Technical Field

The present invention generally relates to a sensor for detecting the presence of moisture. More particularly, the present invention is directed to an optoelectric sensor for detecting the presence of moisture and/or rain on the outside surface of a variety of energy modifying glass windshields.

2. Discussion

Rain sensors that rely on light or infrared (IR) energy reflecting off of the outside surface of a windshield operate under the well understood phenomenon of total internal reflection, and are generally known within the art. In a typical vehicle configuration, the rain sensor is electrically interconnected with the windshield wiper control circuit. Thus, when the presence of moisture or rain is detected on the windshield surface, a signal can be generated for triggering operation of the windshield wipers. These conventional rain sensors also have the capability of detecting the intensity of rain accumulation and may in turn control the windshield wiping frequency.

With reference to FIG. 1, a conventional rain sensor 10 which is optically coupled to a solar absorptive glass windshield 20 is shown. Rain sensor 10 is shown as including an energy source or emitter 12 which emits light energy 28, and using an optical lens 16, directs this energy through inside surface 24, and toward the outside surface 26 of the windshield 20 at an incident angle of principally 45 degrees. This light energy 28 is reflected at the outside surface 26, back through the inside surface 24, and focused by an optical lens 18 onto a photo sensitive detector 14, such as a photo transistor or photo diode. The presence of moisture or rain on the outside surface 26 of the windshield causes a change in the angle of reflection of the incident light energy 28. This change in the angle of reflection results in less light energy 28 being reflected back to the photodetector 14. The electronics controlling rain sensor 10 are capable of detecting moisture and/or rain 22 on the outside surface 26 of the windshield 20 by monitoring and analyzing the amount of light energy 28 returning to photodetector 14.

Advances in windshield technology have allowed the introduction of high performing glasses, such as IR reflective glass. A cross section of this type of IR reflective glass 30 is schematically represented in FIG. 2, and is shown to include an inner reflective layer 32 made up of a material that reflects energy in the IR spectrum. The inner reflective layer 32 is typically a microscopic layer of silver or other suitable reflective material which is situated between an inner glass layer 33 and an outer glass layer 35. This type of windshield glass is highly reflective at IR wavelengths, which assists in keeping the interior of the vehicle cooler when subjected to sunlight. At the same time, this IR reflective glass has a transmissivity level of greater than 75% of the visible spectrum. The transmissivity level of IR reflective glass is typically greater than that of solar absorbing glass in the visible spectrum. Thus, IR reflective glass is favored in many automotive markets since government regulations will not allow solar absorbing glasses to be used because they do not meet the regulated transmissivity levels for visible light.

With continued reference to FIG. 2, this inner reflective layer 32 of windshield 30 creates a significant challenge for IR based rain sensors, such as rain sensor 10, because the inner reflective layer 32 tends to reflect a large amount of the incident light energy 28 to the photodetector 14 before it reaches the outside surface 36 of the glass. The light energy 28 reflected from outside surface 36 is represented as dashed line ray traces 39, and the light energy 28 reflected from inner layer 32 is represented as solid line ray traces 38, both illustrated in FIG. 2. This reflection of light energy 38 from reflective layer 32 reduces the sensitivity and effectiveness of the rain sensor 10 because a larger percentage of the incident energy 28 transmitted by the emitter 12 is reflected from the inner reflective material layer 32 and not the target area of outside surface 36. For example, in a typical IR reflective windshield having an inner reflective layer 32, calculations show that this inner reflective layer causes a sensitivity reduction of the sensor of over 28 dB. Thus, a rain drop 22 landing on the windshield's outside surface 36 has a smaller effect on the change in total energy seen by the photodetector 14.

This change could be compensated for by means of electrically amplifying the signal or by changing multiplying factors in the control and analysis software. However, these methods are undesirable in that a sensor which is modified to work on reflective glass, such as IR reflective glass 30 would be too sensitive on non-reflective or solar absorptive glass, such as windshield 20. Alternatively, separate sensors would need to be incorporated within rain sensor 10 to detect the inner reflective layer 32 allowing the control and analysis software to adapt or switch between operating modes. However, this method adds complexity and cost to the system.

Additionally, this problem is difficult to solve using only an electrical or electronic approach because of the already high gain levels used in the circuitry of these rain sensors. Moreover, if a rain sensor is customized for a particular type of windshield, there is no assurance that the vehicle will not have its windshield replaced in the future with a different type of windshield, thus causing unknown results, including the rain sensor not working on the glass at all. Accordingly, a contemplated solution is to modify the windshield optical coupling device associated with the rain sensor, which is typically supplied with the windshield. To this end, the problems associated with glass replacement and customizing rain sensors for particular windshield reflective layer characteristics are eliminated.

In view of these problems, it is desirable to provide a device and technique for minimizing the effects of the reflective properties of the inner reflective layer associated with IR reflective windshields. In addition, it is desirable to create a rain sensing system that has similar performance using the same sensor on a variety of IR reflective and solar absorptive glass windshields, requiring only a different optical attachment coupler to be bonded to the windshield. It is also desirable to provide an electronic rain sensor system in which a common optoelectric configuration can be used with both IR reflective and solar absorptive glass windshields. Furthermore, it is desirable that this common optoelectric configuration work on a variety of IR reflective glass windshields having different transmissivity levels. Such a device would allow the same rain sensor to be used on a replacement windshield having different reflective properties or physical characteristics without recalibrating the sensor. Finally, it is desirable to provide an optical attachment coupler which is designed for a specific windshield curve, which also includes a standard mounting configuration for receiving and securing the rain sensor in optical contact with the inside surface of the windshield.

SUMMARY OF THE INVENTION

Pursuant to the present invention an optical coupling device for maintaining a moisture sensor in optical contact with a windshield having a reflective layer disposed therein is disclosed. The optical coupling device includes a substrate. A first lens is formed within the substrate for transmitting light energy into the windshield. A second lens is also formed within the substrate for receiving light energy reflected from an outside surface of the windshield. An energy absorbing member is disposed between the first lens and the second lens. The energy absorbing member is positioned for absorbing light energy reflected from the reflective layer.

BRIEF DESCRIPTION OF THE DRAWINGS

Additional objects, advantages and features of the present invention will become apparent from the following description and appended claims, taken in conjunction with the accompanying drawings in which:

FIG. 7A is a graph of the intensity of light energy received from a rain sensor coupled to solar absorptive glass;

FIG. 7B is a graph of the intensity of light energy received from a rain sensor coupled to IR reflective glass;

DETAILED DESCRIPTION OF THE PREFERRED EMBODIMENTS

Figure 3:
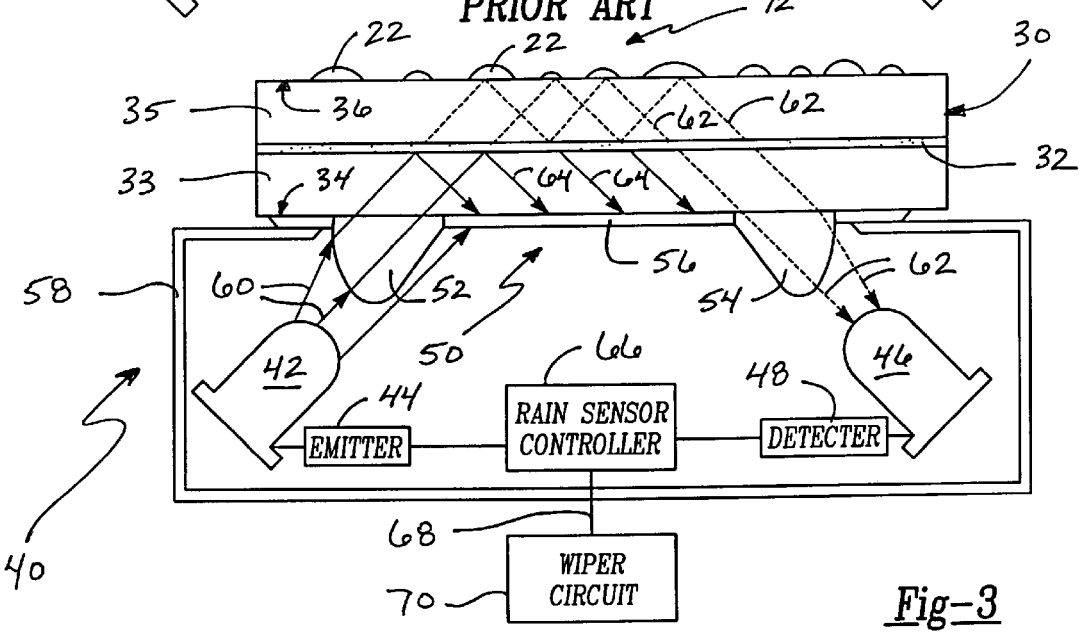
FIG. 3 is a schematic diagram of the rain sensor and energy absorbing device applied to a windshield made from IR reflective glass according to a preferred embodiment of the present invention.

The following description of the preferred embodiments is merely exemplary in nature and is in no way intended to limit the invention, its applications or uses. Turning now to FIG. 3, the configuration of rain sensor 40 and energy absorbing windshield coupler 50 for an IR reflective glass windshield 30 is shown according to the teachings of the present invention. As described above, reflective glass windshield 30 includes an inner glass layer 33 and an outer glass layer 35 with a layer of IR reflective material 32 disposed therebetween. As is generally known in the art, the reflective material 32 is typically a silver or other similar reflective material for selectively reflecting certain wavelengths and particularly the infrared wavelengths of the incoming electromagnetic spectrum.

As shown, rain sensor 40 includes a photoemitter and collimating lens 42 connected to the emitter electronics 44, and a photodetector and focusing lens 46 connected to the detector electronics 48. Preferably, photoemitter 42 is a photo diode or LED for transmitting infrared (IR) light energy into the reflective glass windshield 30. Photodetector 46 is then chosen to compliment photoemitter 42 for receiving IR light energy reflected through the windshield 30. The photoemitter lens 42 is specifically shaped for collimating transmitted IR light energy generated by the emitter electronics 44. Likewise, the photodetector lens 46 is also specifically shaped for focusing IR light energy toward the detector electronics 48. In the preferred embodiment, rain sensor 40 includes four photoemitters 44 and two photodetectors 48 which create a semi-rectangular target area 72 having four regions of sensitivity on the outside surface 36 of windshield 30. Thus, the IR light energy from two photoemitters 44 is directed to one photodetector 48. Each photoemitter has its own lens 42, and each photodetector has a combining lens 46 with two curved surfaces for receiving two rays of reflected light energy 62 and focusing the combined rays onto one photodetector.

Rain sensor 40 further includes a rain sensor controller 66 for operating the emitter electronics 44, as well as receiving signals produced by the detector electronics 48. The rain sensor controller 66 is also connected to the vehicle's wiper circuit 70 for controlling the windshield wiping operation and wiping frequency in response to the presence and/or intensity of rain 22 within target area 72. As described above, the presence of moisture 22 within the target area 72 will cause a change in the angle of reflection of the IR light energy 60 transmitted by photoemitter 42. The components of rain sensor 40 are contained within a housing 58 which is secured to the inside surface 34 of the inner glass layer 33. An external connection 68 is formed within the housing 58 and provides the electrical communication between the rain sensor controller 66 and the wiper circuit 70.

Figure 5:
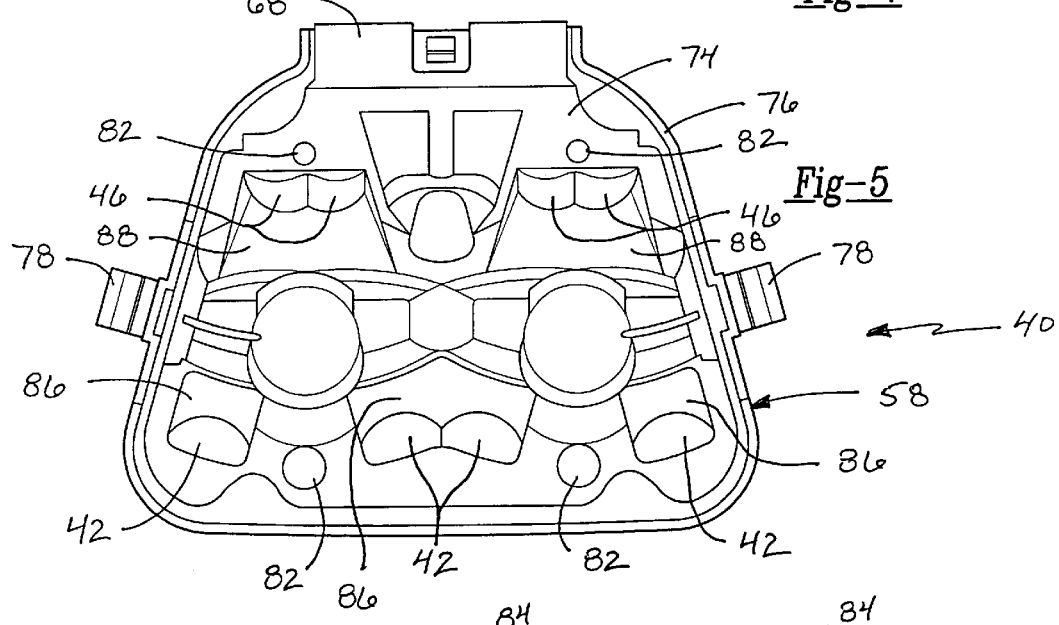
FIG. 5 is a top view of the rain sensor in accordance with a preferred embodiment of the present invention.

Turning now to FIG. 5, a top view of rain sensor 40 shows the arrangement of the internal components within housing 58. As disclosed, rain sensor housing 58 is generally a two-piece trapezoidal shaped housing having a molded plastic outer bottom portion 76, within which a plastic inner top portion 74 is fitted. The electronics of rain sensor 40 are then disposed within the two-piece housing 58. The electrical connector 68 is shown as being integrally formed between top portion 74 and bottom portion 76. As discussed above, the rain sensor 40 includes four separate photoemitter lenses 42 under which four separate photoemitters are disposed, and two separate photodetector lenses 46 under which two separate photodetectors are disposed. Three recessed apertures 86 provide openings for exposing the emitter lenses 42, and a pair of recessed apertures 88 provide openings for exposing the detector lenses 46. A pair of metal spring clips 78 are secured to bottom portion 76, and are used for securing the energy absorbing windshield coupler 50 in precise alignment with the optics within the rain sensor housing 58. Each spring clip 78 is designed to engage a corresponding aperture 80 (FIG. 6) molded within the windshield coupler 50.

Figure 6:
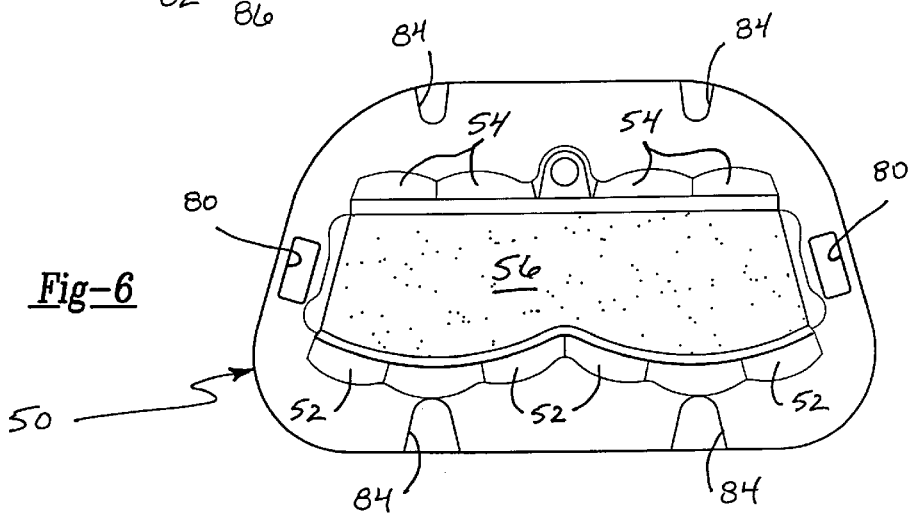
FIG. 6 is a top view of a windshield coupler and energy absorbing device associated with the rain sensor of FIG. 5.

With reference to FIGS. 5 and 6, the inner top portion 74 includes four circular alignment pads 82 which extend above the top surface of housing 58. Four corresponding depressions 84 are molded within windshield coupler 50, and have radiused inner edges for receiving alignment pads 82. These components assist in maintaining the proper optical alignment between windshield coupler 50 and rain sensor housing 58.

A partial section of the energy absorbing windshield coupler 50 of the present invention is schematically shown in FIG. 3. A top view in FIG. 6 shows additional details of the energy absorbing windshield coupler 50. Preferably, coupler 50 is molded as a single component from a dark plastic material such as polycarbonate. A series of four partial collimating lenses 52 and a series of four partial focusing lenses 54 are molded within windshield coupler 50, which correspond with the four photoemitter lenses 42 and the two photodetector lenses 46, respectively. These dark plastic molded lenses include a filtering colorant or dye which allows the partial lenses 52, 54 to transmit IR light energy, and still maintain a dark appearance when viewed from the outside. The preferred colorant or dye is one of either Bayer No. 7950 red or RTP No. SC-51994 dark red transparent. As disclosed, these partial lenses 52, 54 are designed to transmit IR light energy having a wavelength of between about 880–960 nm. As best shown in FIG. 3, each lens 52, 54 has approximately one half of its outer curvature removed. The shape of each lens 52, 54 is particularly significant, in that each partial lens forces more light to be transmitted toward, and received from the target area 72 of IR reflective windshield 30.

While not specifically shown, it should be understood that windshield coupler 50 is flipped over and aligned on top of inner portion 74 such that the radiused depressions 84 engage their corresponding alignment pads 82. The windshield coupler 50 is secured to housing 58 by snapping spring clips 78 into apertures 80. As such, the partial lenses 52, 54 are maintained in the proper optical alignment with their respective lenses 42, 46, and windshield coupler 50 is prevented from moving with respect to the rain sensor housing 58.

With continued reference to FIGS. 3 and 6 the material disposed between partial lenses 52, 54 which forms the energy absorbing material 56 of the present invention is described in more particular detail. The primary function of the energy absorbing material 56 is to absorb IR light energy (represented as solid line light rays 64) reflected from the inner reflective layer 32, and prevent a second reflection of this IR light energy back toward the reflective layer 32. The energy absorbing material 56 is disclosed as being opaque to prevent the transmission of IR light energy 64 into housing 58 where it could potentially be received by the photodetectors. The energy absorbing material 56 also prevents stray IR light energy generated by emitter 42 from entering inner glass layer 33 at the wrong location, for example between partial lenses 52, 54. The preferred material for the energy absorbing material 56 is an IR absorbing coating or paint which is applied to the inside surface of windshield coupler 50. Additionally, it is contemplated that the energy absorbing material 56 may include a dye or pigment which is added to the plastic during the molding process, a different type of plastic material which is suitable for absorbing IR light energy, or an adhesive tape having IR absorbing properties. The function of this energy absorbing device 56 is also described in more detail below.

Figure 4:
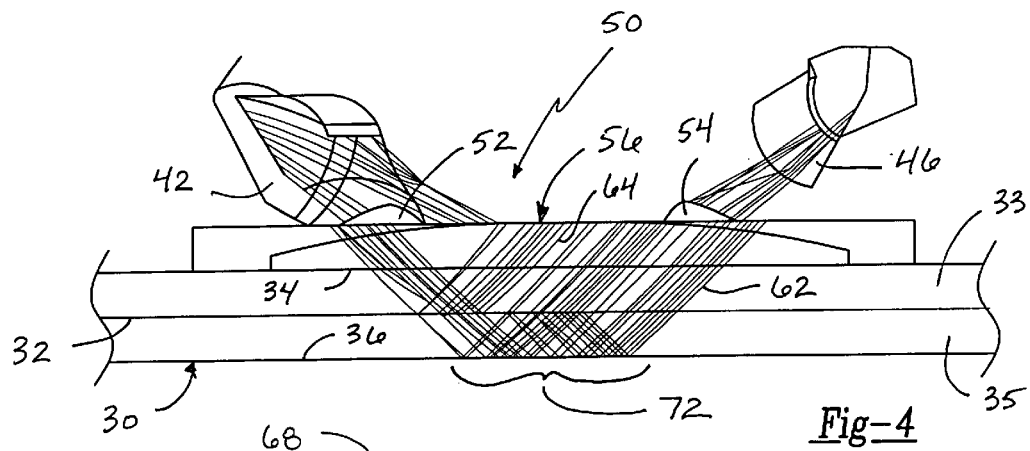
FIG. 4 is a computer model graphical representation of the rain sensor and energy absorbing device showing the modeled path of light energy through a windshield made from IR reflective glass, also according to a preferred embodiment of the present invention.

Referring now to FIGS. 3 and 4, the operation of rain sensor 40 in conjunction with the energy absorbing windshield coupler 50 is described in more detail. In addition, one skilled in the art will appreciate the advantages provided by energy absorbing windshield coupler 50. During the normal rain sensing operation, collimated IR light rays 60 are directed toward partial lens 52 which is optically coupled to the inside surface 34 of reflective windshield 30. This incident IR light energy 60 is transmitted into inner glass layer 33 toward the target area 72 of outside surface 36. A portion of the IR light energy 60 passes through the inner reflective layer 32 and strikes the outside surface 36 where it is internally reflected back toward the reflective layer 32. This internally reflected light energy represented by ray traces 62 is typically reflected by reflective layer 32 back toward outside surface 36, and again reflected by outside surface 36 toward partial detector lens 54. As shown, this IR light energy 62 will typically be internally reflected two times by outer surface 36 before returning to photodetector 46.

A portion of the incident IR light energy 60 striking inner reflective layer 32 is reflected back through inner glass layer 33 toward inside surface 34. As represented by solid line ray traces 64, this IR light energy will be absorbed by the energy absorbing material 56 disposed on windshield coupler 50, and will not again be reflected back toward reflective layer 32. As best shown in FIG. 3, the energy absorbing material 56 is in optical contact with inside surface 34. Because the energy absorbing material 56 is capable of absorbing a significant amount of the reflected IR light energy 64, the IR light signal 62 internally reflected through the outer glass layer 35 is significantly more representative of the light used for detecting the presence of moisture or rain 22 within the target area 72 on the outside surface 36 of IR reflective windshield 30.

The computer modeled simulation of rain sensor 40 in FIG. 4 shows that a significant portion of the IR light energy 64 which is reflected by inner reflective layer 32 is absorbed by energy absorbing material 56. FIG. 4 also shows that most of the IR light energy 62 which is reflected only once by outside surface 36 is also absorbed by energy absorbing material 56. Additionally, it is preferred that the width of the energy absorbing material 56 between partial lenses 52, 54 is chosen to be approximately two times the thickness of the windshield 30. This configuration serves to maximize the amount of light energy 62 which is internally reflected through outer glass layer 35. More specifically, this configuration causes most of the light energy 62 received by detector 46 to be internally reflected two times by outside surface 36. As can be appreciated, this geometric configuration approximates an isosceles triangle where the width of energy absorbing material 56 is the base dimension of the triangle, and the thickness of the windshield 30 is the height of the triangle. Accordingly, only the incident light energy 60 transmitted through the innermost portion of emitter lenses 42 is able to reach the innermost portion of detector lenses 46 while only being reflected one time by outside surface 36. The experimental data described in more detail below indicates that the addition of the energy absorbing windshield coupler 50 of the present invention serves to increase the gain of the signal received by the photodetectors by as much as 30 dB.

Referring to FIGS. 7A–7D, experimental data representing the IR light intensity received by the photodetectors of a rain sensor is depicted graphically. Each graph of FIGS. 7A–7D includes four data plots which correspond to the four target areas resulting from the combination of the four photoemitters and two photodetectors associated with the preferred implementation of rain sensor 40 described above. It should be assumed that the same rain sensor was used to collect the data, with the changes to the rain sensor and/or windshield being described for each graph.

Figure 1:
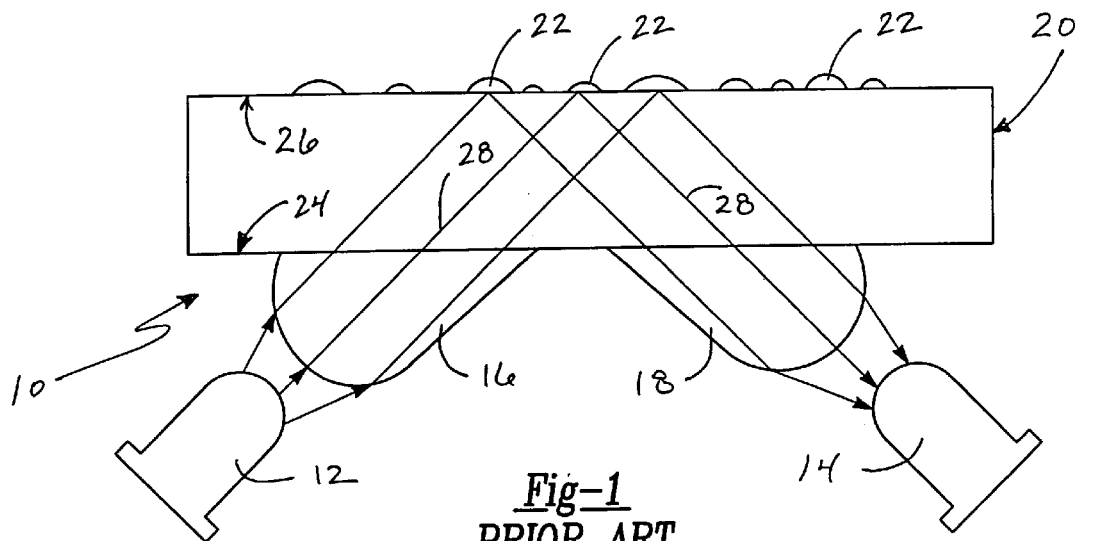
FIG. 1 is a schematic diagram of a conventional rain sensor which is coupled to a windshield made from solar absorptive glass, as is generally known within the prior art.

The graph in FIG. 7A represents the data taken from a rain sensor which is coupled to an absorptive glass windshield, such as glass windshield 20. This rain sensor and windshield configuration is similar to that shown in FIG. 1. The four data plots 102 on graph 100 show the intensity of IR light received from the target areas. These data plots 102 are also indicative of the expected and desired intensity levels of IR light energy reflected from the outside surface of an absorptive glass windshield. As shown, the photodetectors are receiving a reflected signal having an average gain level of approximately 20–30 dB, which is sufficient for processing by the rain sensor electronics.

Figure 2:
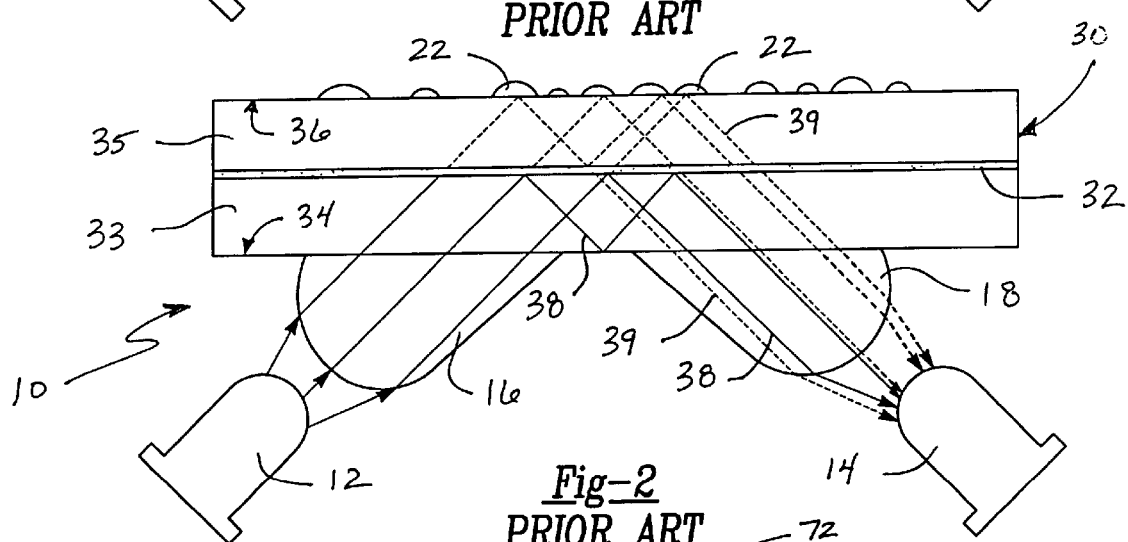
FIG. 2 is a schematic diagram of a conventional rain sensor which is coupled to a windshield made from infrared (IR) reflective glass shown without the energy absorbing device of the present invention.

The graph of FIG. 7B represents the data taken from a rain sensor which is coupled to an IR reflective glass windshield, such as glass windshield 30. This rain sensor and windshield configuration is similar to that shown in FIG. 2. As shown by the three data plots 106 in graph 104, only three of the four target areas register a signal. In addition, the signals received by the photodetectors have very low gain or intensity levels. This is primarily caused by the amount of IR energy which is reflected from the inner reflective layer 32, rather than being reflected from the outside surface 36. These signal levels have an average gain of less than 9 dB, which is insufficient for processing by the rain sensor electronics.

Figure 7C:
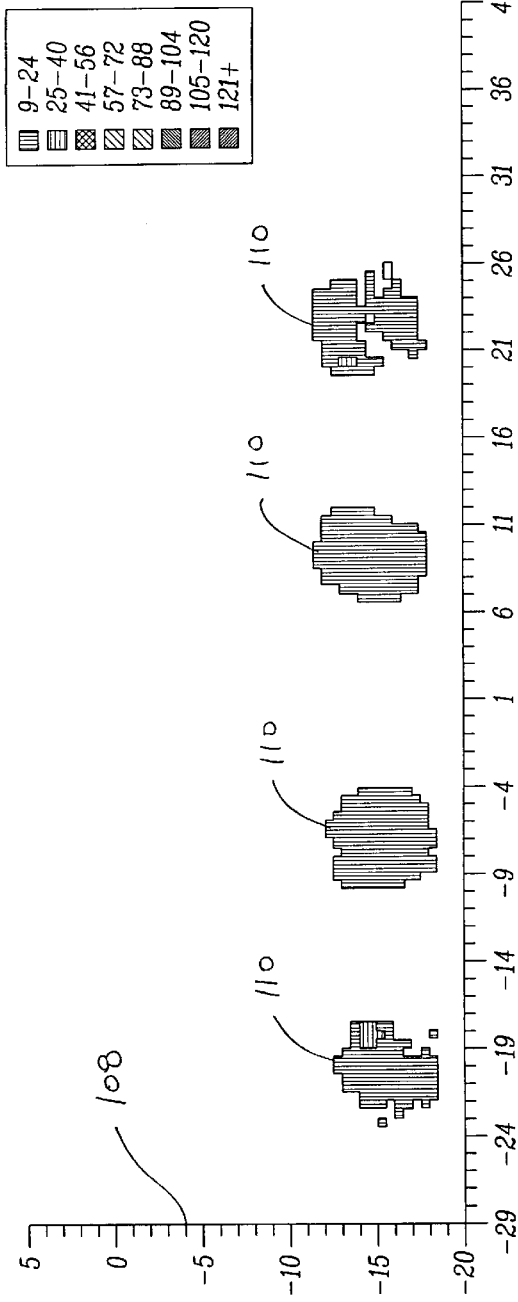
FIG. 7C is a graph of the intensity of light energy received from a rain sensor coupled to IR reflective glass having an increased operating gain within its electronic circuitry.

The graph of FIG. 7C represents the data taken from a rain sensor which is also coupled to an IR reflective glass windshield 30. However, the rain sensor producing this data is modified by increasing the gain of the rain sensor electronics by 9.5 dB to compensate for the effects of the inner reflective layer 32. It should be understood that this increased gain level is the highest feasible gain increase without making significant and expensive modifications to the rain sensor electronics. As shown on graph 108, the four plots 110 indicate that the photodetectors receive a signal having a higher intensity value. However, the intensity level of the signal received from each target area is still not as high as the intensity levels of graph 100 of FIG. 7A. Thus, graph 108 reinforces the proposition that merely increasing the gain within the rain sensor electronics does not completely solve the problem of using an IR based rain sensor with IR reflective glass.

Figure 7D:
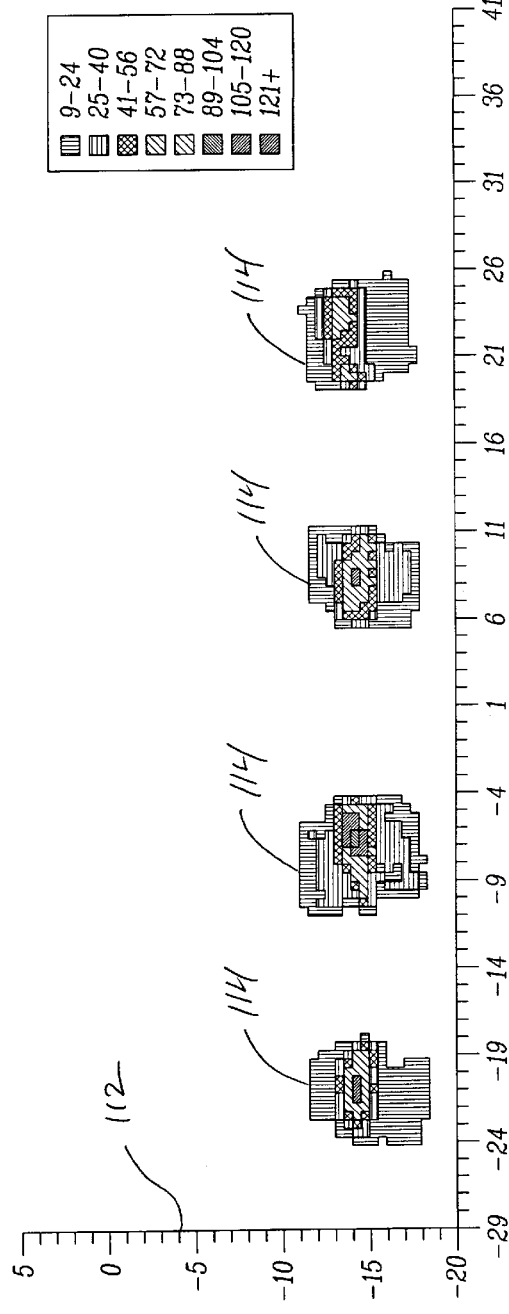
FIG. 7D is a graph of the intensity of light energy received from a rain sensor coupled to IR reflective glass utilizing the energy absorbing device of the present invention, with no increased operating gain within its electronic circuitry.

The graph of FIG. 7D represents the data taken from a rain sensor which is also coupled to an IR reflective glass windshield 30. In this configuration, rain sensor 40 is coupled to windshield 30 using the energy absorbing windshield coupler 50 of the present invention. As shown in graph 112, the four data plots 114 indicate that the photodetectors 46 receive signals from the target areas having the desired intensity level. The test data shows that the windshield coupler 50 of the present invention results in an effective gain increase on IR reflective type glass of between about 20–30 db. Of particular interest is that this effective increase in gain is achieved without increasing the gain within the rain sensor electronics. Moreover, a comparison between FIGS. 7A and 7D shows that the data plots 102 of graph 100 have intensity values which are substantially similar to the data plots 114 of graph 112. Accordingly, FIG. 7D illustrates the significant yet efficient increase in gain achieved by the energy absorbing windshield coupler 50.

The following discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A device for detecting the presence of moisture on an outside surface of a windshield comprising:
   a first glass layer and a second glass layer forming the windshield, the first glass layer for securing the device, and the second glass layer forming the outside surface of the windshield;
   a reflective layer disposed between the first glass layer and the second glass layer;
   an emitter for transmitting energy through the first and second layers;
   a sensor for receiving energy reflected from the outside surface;
   an energy absorbing member for contacting the first glass layer, the energy absorbing member disposed between the emitter and the sensor for absorbing energy reflected from the reflective layer; and
   a controller for monitoring the energy received by the sensor and determining the presence of moisture.

2. The device of claim 1 wherein the reflective layer includes a material which is reflective of infrared light energy.

3. The device of claim 1 wherein the emitter is a photo-emitter for transmitting infrared light energy.

4. The device of claim 1 wherein the sensor is a photodetector.

5. The device of claim 1 wherein a potion of the energy transmitted from the emitter passes through the reflective layer.

6. The device of claim 1 wherein the energy absorbing member has a width which is two times a thickness of the windshield.

7. The device of claim 1 wherein a portion of the energy received by the sensor is internally reflected two times by the outside surface before being received by the sensor.

8. The device of claim 1 wherein the device is capable of operating on one of a reflective windshield and a non-reflective windshield.

9. The device of claim 1 wherein the controller provides a signal for operating a wiping frequency of a wiper system associated with the windshield.

10. A rain sensor for detecting the presence of rain on an outside surface of a windshield which is reflective of light energy at the infrared spectrum, said windshield having a first glass layer, a second glass layer, and an infrared reflective layer disposed therebetween, and wherein the rain sensor is secured to an inside surface of the first glass layer and the second glass layer forms the outside surface of the windshield, said rain sensor comprising:
   a photoemitter for transmitting infrared light energy through the first and second glass layers and toward the outside surface;
   a photodetector for receiving infrared light energy reflected from the outside surface;
   an energy absorbing member for contacting the first glass layer, the energy absorbing member disposed between the photoemitter and the photodetector for absorbing infrared light energy reflected from the reflective layer; and
   a controller for monitoring the infrared light energy received by the photodetector and determining the presence of moisture on the outside surface;
   wherein a portion of the infrared light energy transmitted from the photoemitter passes through the reflective layer, and is reflected from the outside surface toward the photodetector.

11. The rain sensor of claim 10 wherein the energy absorbing member has a width which is two times a thickness of the windshield.

12. The rain sensor of claim 10 wherein a portion of the infrared light energy received by the photodetector is internally reflected two times by the outside surface before being received by the photodetector.

13. The rain sensor of claim 10 wherein the controller is capable of measuring the intensity of rain accumulating on the outside surface of the windshield.

14. The rain sensor of claim 10 wherein the controller provides a signal for operating a wiping frequency of a wiper system associated with the windshield.

* * * * *